United States Patent
Kim et al.

(10) Patent No.: US 8,766,977 B2
(45) Date of Patent: Jul. 1, 2014

(54) APPARATUS AND METHOD FOR GENERATING SKELETON MODEL USING MOTION DATA AND IMAGE DATA

(75) Inventors: Chang Yeong Kim, Seoul (KR); Won Chul Bang, Seongnam-si (KR); Do Kyoon Kim, Seongnam-si (KR); Kee Chang Lee, Yongin-si (KR); Jae Joon Han, Seoul (KR); Hwa Sup Lim, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 863 days.

(21) Appl. No.: 12/539,170

(22) Filed: Aug. 11, 2009

(65) Prior Publication Data

US 2010/0238168 A1  Sep. 23, 2010

(30) Foreign Application Priority Data

Mar. 17, 2009 (KR) .................. 10-2009-0022506

(51) Int. Cl.
*G06T 17/00* (2006.01)
*G06K 9/00* (2006.01)
*G06K 9/44* (2006.01)

(52) U.S. Cl.
USPC ............................ 345/420; 382/154; 382/259

(58) Field of Classification Search
USPC .......................................... 345/420; 382/154
See application file for complete search history.

(56) References Cited

U.S. PATENT DOCUMENTS

| 2006/0274947 A1* | 12/2006 | Fujimura et al. | 382/201 |
| 2008/0152191 A1* | 6/2008 | Fujimura et al. | 382/103 |
| 2009/0220124 A1* | 9/2009 | Siegel | 382/103 |
| 2010/0164862 A1* | 7/2010 | Sullivan et al. | 345/156 |

OTHER PUBLICATIONS

Sigal et al. "HumanEva: Synchronized Video and Motion Capture Dataset for Evaluation of Articulated Human Motion" CS-0608, Sep. 2006.*
Hwang et al. "2D and 3D Full-Body Gesture Database for analyzing Daily Human Gestures", ICIC 2005, Part I, LNCS 3644, pp. 611-620, 2005.*
Chinese Office Action issued Oct. 24, 2013 in corresponding Chinese Application No. 201010003173.0.

* cited by examiner

*Primary Examiner* — Xiao Wu
*Assistant Examiner* — Yingchun He
(74) *Attorney, Agent, or Firm* — Staas & Halsey LLP

(57) ABSTRACT

An apparatus and method for generating a skeleton model using motion data and image data. The apparatus for generating the skeleton model may synchronize the image data and the motion data, and generate a three-dimensional (3D) skeleton model of an entire body of a user using a silhouette extracted from the image data and also using a position or orientation of a joint of the user extracted from the motion data. The skeleton model may be generated using the image data and the motion data, thereby improving accuracy of the skeleton model of the entire body of the user.

18 Claims, 9 Drawing Sheets

APPARATUS AND METHOD FOR GENERATING SKELETON MODEL USING MOTION DATA AND IMAGE DATA

CROSS-REFERENCE TO RELATED APPLICATIONS

This application claims the benefit of Korean Patent Application No. 10-2009-0022506, filed on Mar. 17, 2009, in the Korean Intellectual Property Office, the disclosure of which is incorporated herein by reference.

BACKGROUND

1. Field

Example embodiments relate to a technique of modeling a user in a virtual reality, and more particularly, to an apparatus and method for generating a three-dimensional (3D) skeleton model with respect to an entire body of a user using data collected from an image sensor and a motion sensor 2. Description of the Related Art Currently, various techniques using a virtual reality have been suggested. In particular, a technique in which a real motion of a user is reflected in the virtual reality by sensing a motion of the user has been gaining attention. A trajectory of an entire body of the user may be an important means for interaction with a virtual environment such as games, etc.

In conventional art, there are a variety of methods for sensing motions of the user. For example, there may be a method of modeling the motions of the user by attaching numerous markers on the entire body of the user, or by simply capturing images of the user.

In the method using the markers, it may be difficult to accurately measure the motions of the user due to a reduction in activity of the user, or it may be impossible to measure the motions of the user when the markers are not visible by the occlusion. Also, a calibration using a specific pose regardless of the number of sensors may be needed. In the method of capturing the user, an accuracy of a 3-dimensional (3D) position may be deteriorated when the number of capturing devices is relatively small, and it may be difficult to model the motions of the user when parts of the entire body of the user are overlapped. Also, it may be impossible to detect a position or orientation with respect to joints of the user.

Therefore, there is a need for a method which more effectively models the entire body of the user.

SUMMARY

According to example embodiments, there may be provided an apparatus for generating a skeleton model, the apparatus including a data synchronization unit to perform a synchronization respectively upon image data for a user collected by an image sensor and motion data for the user collected by a motion sensor, a silhouette extraction unit to extract a silhouette of the user from the synchronized image data, a joint information calculation unit to calculate a position or orientation of a joint of the user from the synchronized motion data, and a skeleton model generation unit to generate a three-dimensional (3D) skeleton model of an entire body of the user using the silhouette and the position or orientation of the joint of the user.

In this instance, the skeleton model generation unit may generate the 3D skeleton model of the entire body of the user from the position or orientation of the joint of the user based on the silhouette.

Also, the skeleton model generation unit may generate the 3D skeleton model of the entire body of the user from the silhouette based on the position and orientation of the joint of the user.

Also, the skeleton model generation unit may generate the 3D skeleton model of the entire body of the user using an error range of each of 3D skeleton models extracted from the silhouette and from the position or orientation of the joint of the user.

According to example embodiments, there may be also provided a method of generating a skeleton model, the method including performing a synchronization respectively upon image data for a user collected by an image sensor and motion data for the user collected by a motion sensor, extracting a silhouette of the user from the synchronized image data, calculating a position or orientation of a joint of the user from the synchronized motion data, and generating a 3D skeleton model of an entire body of the user using the silhouette and the position or orientation of the joint of the user.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
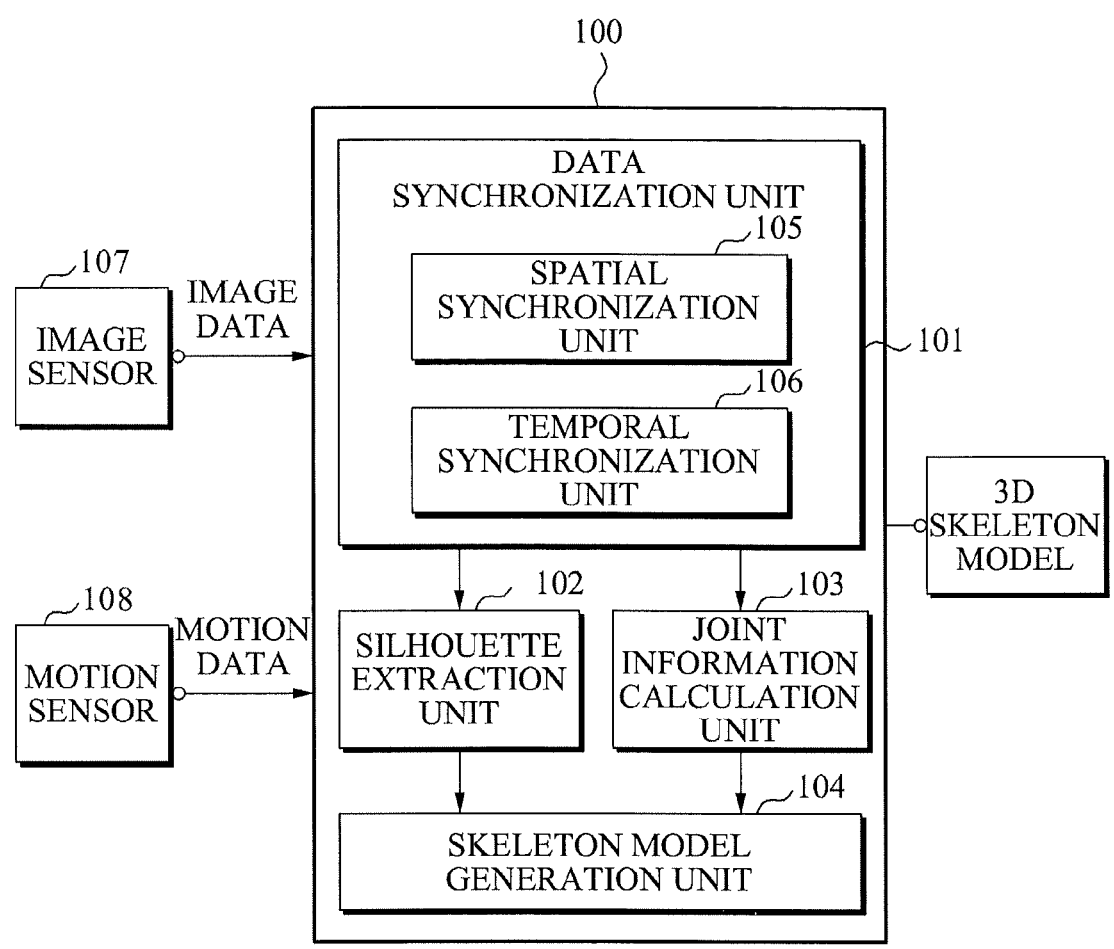
FIG. 1 illustrates a block diagram of an entire configuration of an apparatus for generating a skeleton model according to example embodiments.

Reference will now be made in detail to one or more embodiments, examples of which are illustrated in the accompanying drawings, wherein like reference numerals refer to the like elements throughout. Example embodiments are described below to explain the present disclosure by referring to the figures.

FIG. 1 illustrates a block diagram of an entire configuration of an apparatus 100 for generating a skeleton model according to example embodiments.

Referring to FIG. 1, the apparatus 100 may include a data synchronization unit 101, a silhouette extraction unit 102, a joint information calculation unit 103, and a skeleton model generation unit 104.

The apparatus 100 may generate a three-dimensional (3D) skeleton model of an entire body of a user using image data for the user and motion data for the user, and then sense an entire body of the user through the generated 3D skeleton model, thereby obtaining trajectory of motions of the user.

The data synchronization unit 101 may perform synchronization between image data for a user collected by an image sensor 107, and motion data for the user collected by a motion sensor 108. The apparatus 100 may cross-reference the image data and the motion data through synchronization of data when generating the 3D skeleton model.

For example, the image sensor 107 may denote a device (for example, camera, camcorder, etc.) that photographs a user to collect image data. In this instance, the image sensor 107 may include a depth image sensor that collects depth image data (3D) with respect to a user and a color image sensor that collects color image data (2D) with respect to the user. According to example embodiments, the motion sensor 108 may be mounted in a part of multiple joints constituting the user.

Referring to FIG. 1, the data synchronization unit 101 may include a spatial synchronization unit 105 and a temporal synchronization unit 106.

The spatial synchronization unit 105 may synchronize position information of data to cross-reference, in an identical position, the image data and the motion data each being collected in different positions. For example, the spatial synchronization unit 105 may synchronize the position information of data by converting a position of the motion sensor 108 in the image data and a position of the motion sensor 108 in the motion data based on a predetermined reference position. In this instance, the reference position may designate an origin on world coordinates. Specifically, the spatial synchronization unit 105 may convert local coordinates of the motion sensor 108 into the world coordinates, and also convert local coordinates of the image sensor 107 into the world coordinates, thereby cross-referencing the motion data collected by the motion sensor 108 and the image data collected by the image sensor 107.

The temporal synchronization unit 106 may synchronize temporal information of the image data and of the motion data to cross-reference, in an identical time, the image data and the motion data that are collected in different times. For example, the temporal synchronization unit 106 may synchronize temporal information of the image data and of the motion data using data interpolation. Specifically, the temporal synchronization unit 106 may adjust a difference in time of data acquisition between the motion sensor 108 and the image sensor 107.

The silhouette extraction unit 102 may extract a silhouette of the user from the synchronized image data.

The joint information calculation unit 103 may calculate a position or orientation of the joint of the user from the synchronized motion data.

The skeleton model generation unit 104 may generate a 3D skeleton model of an entire body of the user using the position or orientation of the joint of the user and also using the silhouette.

According to example embodiments, the skeleton model generation unit 104 may generate the 3D skeleton model of the entire body of the user from the position or orientation of the joint of the user referencing the silhouette information. In this instance, the skeleton model generation unit 104 may calculate a solution of remaining joints of the user from the position or orientation of the joint of the user included in the motion data using Inverse-Kinematics, and select an optimal solution included in a range of the silhouette when the solution is plural.

According to example embodiments, the skeleton model generation unit 104 may generate the 3D skeleton model of the entire body of the user from the silhouette based on the position or orientation of the joint of the user. In this instance, the skeleton model generation unit 104 may determine remaining joints of the user included in a range of the silhouette using a reference point extracted from the silhouette and also using the position or orientation of the joint of the user included in the motion data.

According to other example embodiments, the skeleton model generation unit 104 may generate the 3D skeleton model of the entire body of the user using an error range of each of the 3D skeleton models extracted from the silhouette and from the position or orientation of the joint of the user. In this instance, the skeleton model generation unit 104 may combine the error range of each of the 3D skeleton models extracted from the silhouette and the position or orientation of the joint of the user, and select a position having a minimum error.

Figure 2:
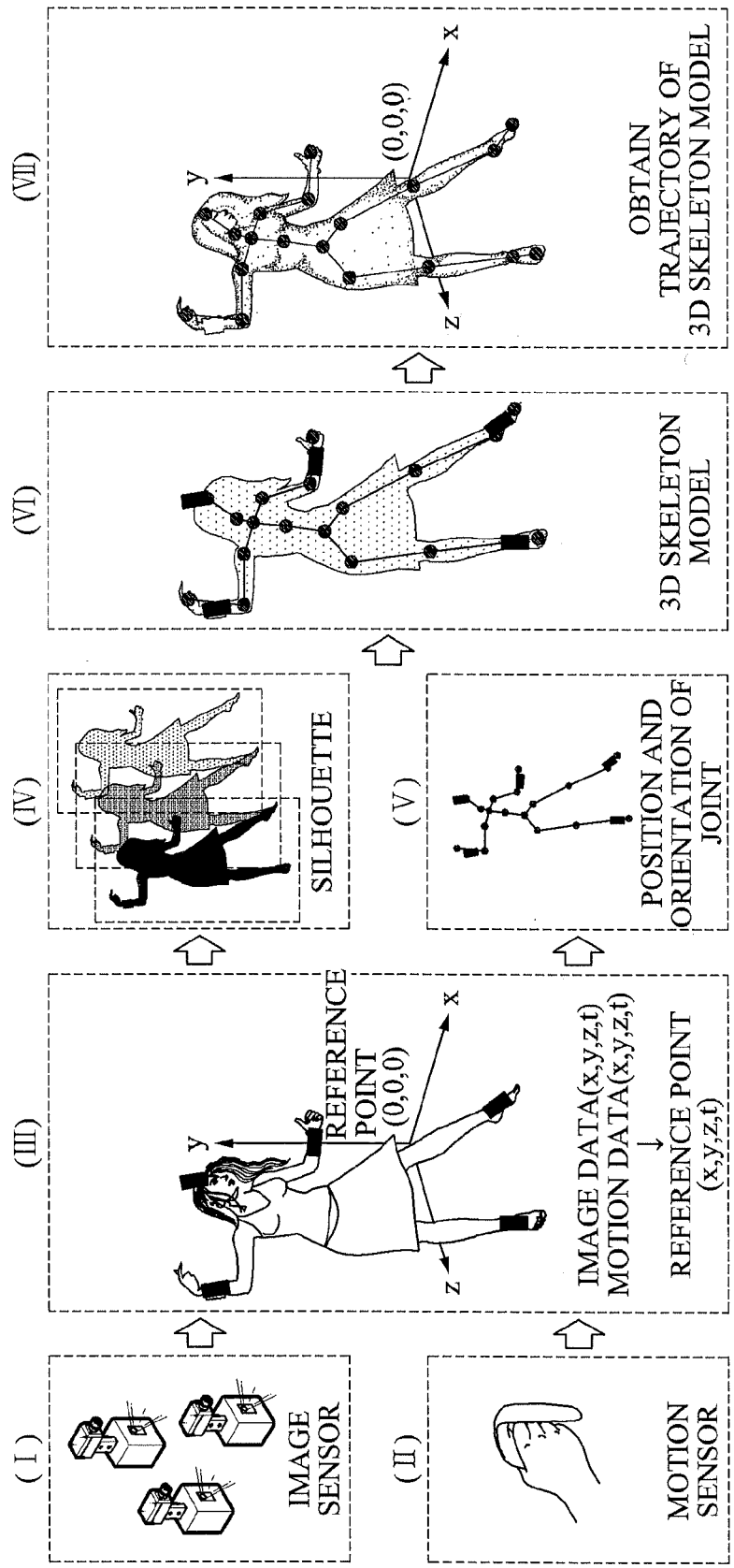
FIG. 2 illustrates a process of generating a three-dimensional (3D) skeleton model with respect to an entire body of a user using an image sensor and a motion sensor according to example embodiments.

FIG. 2 illustrates a process of generating a three-dimensional (3D) skeleton model with respect to an entire body of a user using an image sensor and a motion sensor according to example embodiments.

Referring to operation (I) of FIG. 2, at least one image sensor may collect image data for a user. Specifically, the image sensor may photograph the user to obtain images of the user. For example, the image sensor may be a depth image sensor or a color image sensor. In this instance, the image sensor may be disposed at a predetermined distance, and obtain multi-view image data.

Referring to operation (II) of FIG. 2, at least one motion sensor may collect motion data for a user. According to example embodiments, the motion sensor may be attached on the user. In this instance, the motion sensor may be attached on joints of the user. However, since a processing time required for sensing the entire body of the user when the motion sensor are attached on all joints of the user may be relatively longer, the motion sensor may be attached on only some of the joints.

Referring to operation (III) of FIG. 2, and FIG. 1, the apparatus 100 may perform a spatial synchronization and a temporal synchronization with respect to the image data and with respect to the motion data so that the image data collected by the image sensor 107 and the motion data collected by the motion sensor 108 are cross-referenced. The spatial synchronization will be further described with reference to FIG. 4, and the temporal synchronization will be further described with reference to FIG. 5.

Referring to operation (IV) of FIG. 2, and FIG. 1, the apparatus 100 may extract a silhouette of the user from the image data. When the image sensor 107 obtains the multi-view image data again, the silhouette may be extracted per point of view.

Referring to operation (V) of FIG. 2, and FIG. 1, the apparatus 100 may calculate a position or orientation of the joint of the user from the motion data. In this instance, the apparatus 100 may calculate the position or orientation of the joint of the user on which the motion sensor 108 is attached.

Referring to operation (VI) of FIG. 2, and FIG. 1, the apparatus 100 may generate the 3D skeleton model of the entire body of the user using the position or orientation of the joint of the user and also using the extracted silhouette. In this instance, the apparatus 100 may determine information (position or orientation) about remaining joints that are not calculated in operation (V) of FIG. 2, thereby generating the 3D skeleton model including the joints of the entire body of the user.

Referring to operation (VII) of FIG. 2, and FIG. 1, the apparatus 100 may output a trajectory of motions of an entire body of the 3D skeleton model at every time instance using the generated 3D skeleton model. Specifically, the apparatus 100 may apply real-time motions of the entire body of the user to a virtual 3D skeleton model.

Figure 3:
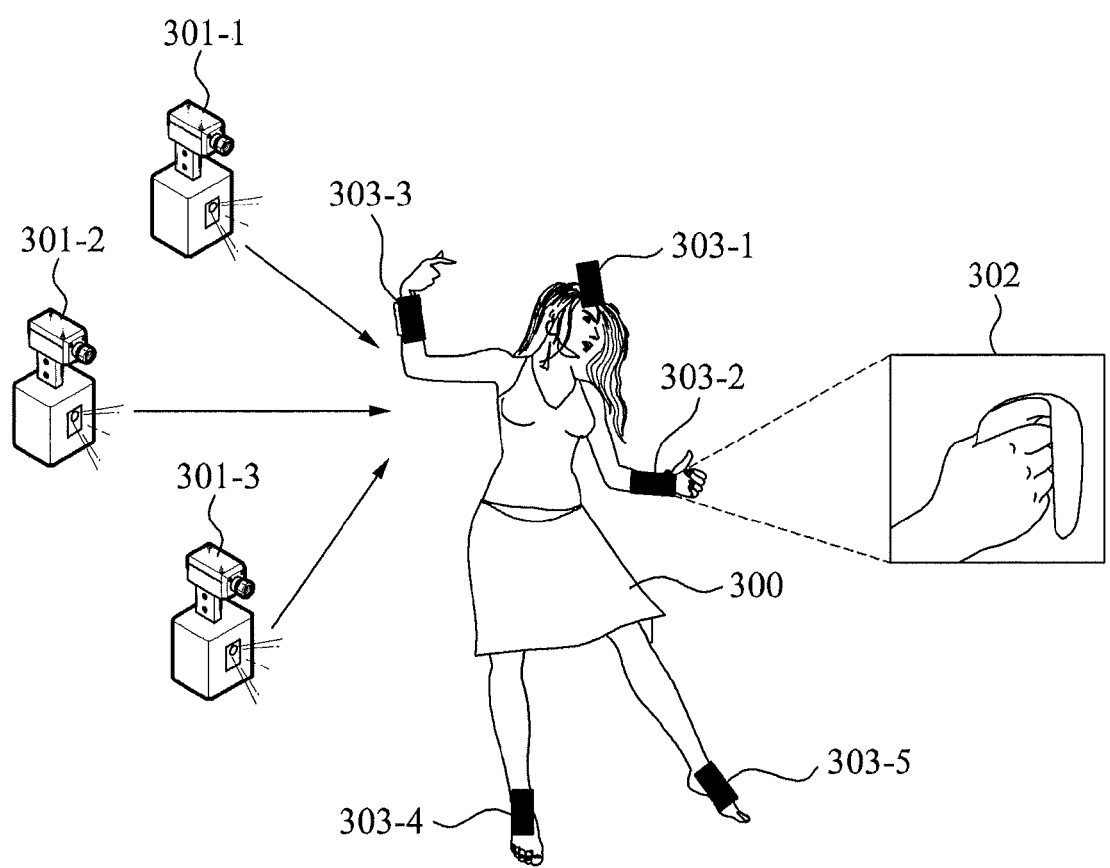
FIG. 3 illustrates an example of collecting image data for a user and motion data for the user according to example embodiments.

FIG. 3 illustrates an example of collecting image data for a user and motion data for the user according to example embodiments.

Referring to FIG. 3, image sensors 301-1, 301-2, and 301-3, collecting the image data, may be disposed to photograph an entire body of a user 300. A motion sensor 302 collecting motion data may be attached on specific parts 301-1, 301-2, 301-3, 301-4, and 301-5 of the user 300. In this instance, the image sensors 301-1 to 301-3 may be a color image sensor collecting color image data with respect to the user 300 or a depth image sensor collecting depth image data with respect to the user 300. There may be at least one image sensor.

For example, the motion sensor 302 may be attached on edge portions of the user 300 such as a head portion 301-1, hands portions 301-2 and 301-3, feet portions 301-4 and 301-5, etc. The above-mentioned portions of the user 300 on which the motion sensor 302 is attached are merely an example, and the motion sensor 302 may be attached on various body portions of the user 300.

Figure 4:
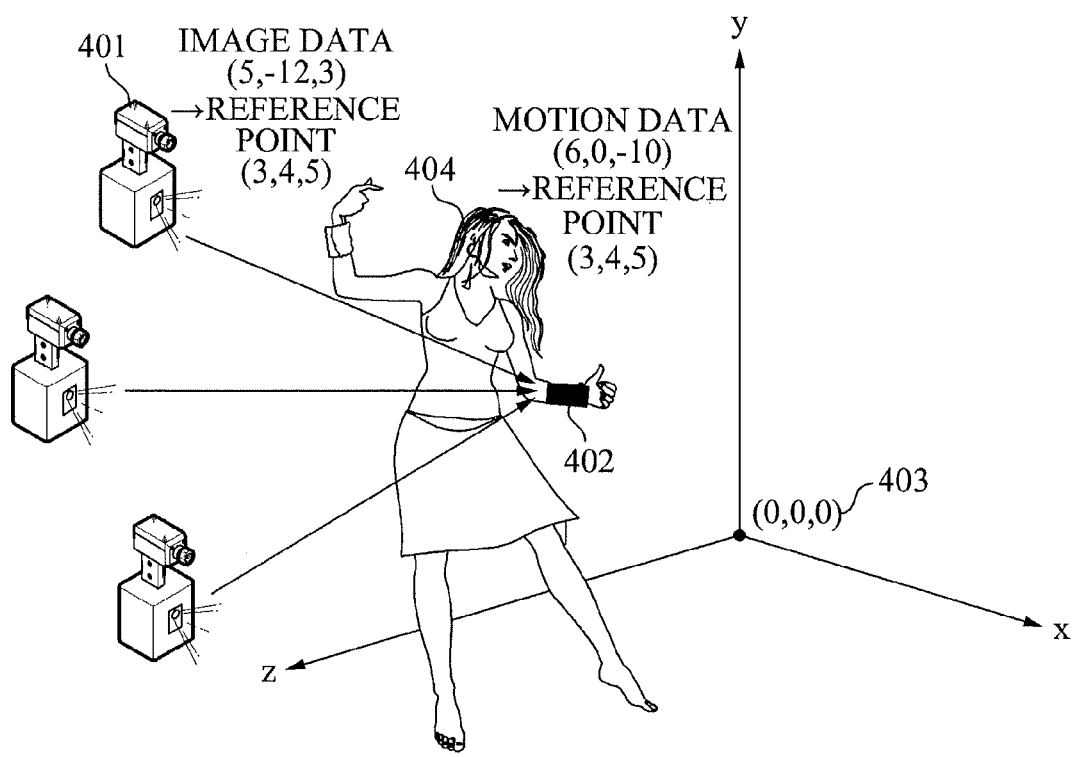
FIG. 4 illustrates a diagram of a process of performing a spatial synchronization between image data and motion data according to example embodiments.

FIG. 4 illustrates a diagram of a process of performing a spatial synchronization between image data and motion data according to example embodiments.

The skeleton model generation unit 100 (FIG. 1) may perform synchronization between image data for a user collected by the image sensor 107 (FIG. 1) and motion data for the user collected by the motion sensor 108 (FIG. 1). For example, the apparatus 100 (FIG. 1) may synchronize position information of data so that the image data and the motion data each collected in different positions are cross-referenced in an identical position. In this instance, the apparatus 100 (FIG. 1) may convert a position of the motion sensor 108 (FIG. 1) in the image data and a position of the motion sensor 108 (FIG. 1) in the motion data based on a predetermined reference position, thereby synchronizing the position information of data.

Referring to FIG. 4, an image sensor 401 may photograph an entire body of a user 404. In this instance, image data collected by the image sensor 401 may include position information of the motion sensor 402. As illustrated in FIG. 4, a position of the motion sensor 402 in the image data may correspond to a point (5, −12, 3). Also, the motion data collected by the motion sensor 402 may include position information of the motion sensor 402. As illustrated in FIG. 4, a position of the motion sensor 402 in the motion data may correspond to a point (6, 0, −10). Specifically, the image data and the motion data, with respect to an identical position, may have different position values due to being located at different points.

According to example embodiments, in order to generate the 3D skeleton model of the entire body of the user, the apparatus 100 (FIG. 1) may perform coordinate conversion with respect to an identical reference point to cross-reference the image data and the motion data. The image data may be configured of local coordinates of the image sensor 401, and the motion data may be configured of local coordinates of the motion sensor 402. Consequently, the apparatus 100 (FIG. 1) may match data configured of local coordinates of the image sensor 401 and of the motion sensor 402 to the same world coordinates. In this instance, the world coordinates may denote coordinates achieved with respect to a reference point 403 (0, 0, 0).

Referring to FIG. 4, the point (5, −12, 3) of image data with respect to the position of the motion sensor may be converted into a point (3, 4, 5) with respect to the reference point 403, and the point (6, 0, −10) of the motion data with respect to the position of the motion sensor may be converted into the point (3, 4, 5) with respect to the reference point 403. In this manner, the coordinate conversion may be identically applicable in continuously inputted image data and motion data.

Figure 5:
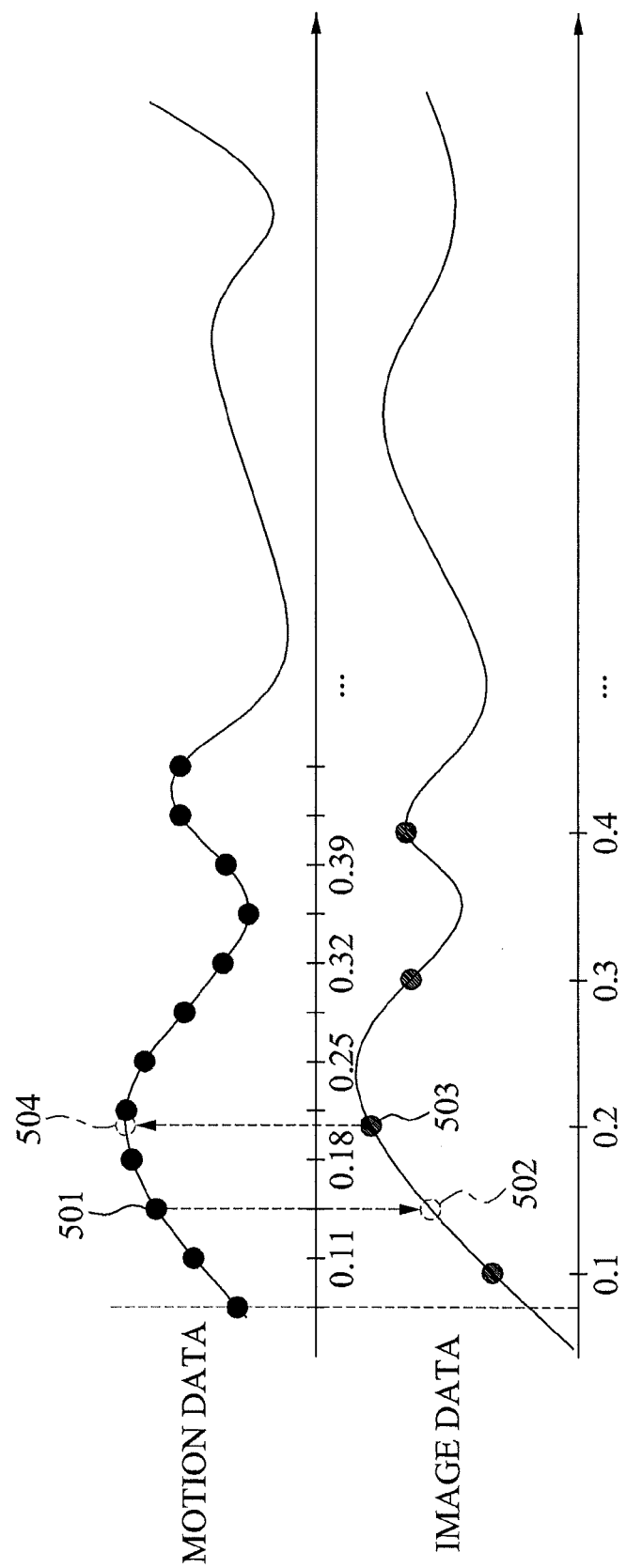
FIG. 5 illustrates a diagram of a process of performing a temporal synchronization between image data and motion data according to example embodiments.

FIG. 5 illustrates a diagram of a process of performing a temporal synchronization between image data and motion data according to example embodiments.

Referring to FIG. 5, collection points in time of motion data and of image data are illustrated over time. Since the ratio of data collection between the motion sensor 108 (FIG. 1) and the image sensor 107 (FIG. 1) may differ, the collection points of time may differ. The apparatus 100 (FIG. 1) may cross-reference the image data and the motion data to generate the 3D skeleton model.

In a case of referencing the image data when the 3D skeleton model is generated from motion data 501, the apparatus 100 (FIG. 1) may generate image data 502 corresponding to a collection point in time of the motion data 501 using image data respectively collected at 0.1 seconds and 0.2 seconds. Thereafter, the apparatus 100 (FIG. 1) may generate a skeleton model of an entire body of the user while referencing the generated image data 502.

Conversely, in a case of referencing the motion data when the 3D skeleton model is generated from image data 503, the apparatus 100 (FIG. 1) may generate motion data 504 corresponding to the collection point in time of the image data 503 using motion data respectively collected at 0.18 seconds and 0.21 seconds. Thereafter, the apparatus 100 (FIG. 1) may generate the skeleton model of the entire body of the user while referencing the generate motion data 504.

For example, the apparatus 100 (FIG. 1) may synchronize temporal information of the image data and of the motion data using data interpolation. Referring to FIGS. 1 and 5, the apparatus 100 may interpolate image data respectively collected at 0.1 seconds and 0.2 seconds to generate the image data 502 corresponding to the collection point in time of the motion data 501. Also, the apparatus 100 may interpolate motion data respectively collected at 0.18 seconds and 0.21 seconds to generate the motion data 504 corresponding to the collection point in time of the image data 503.

Figure 6:
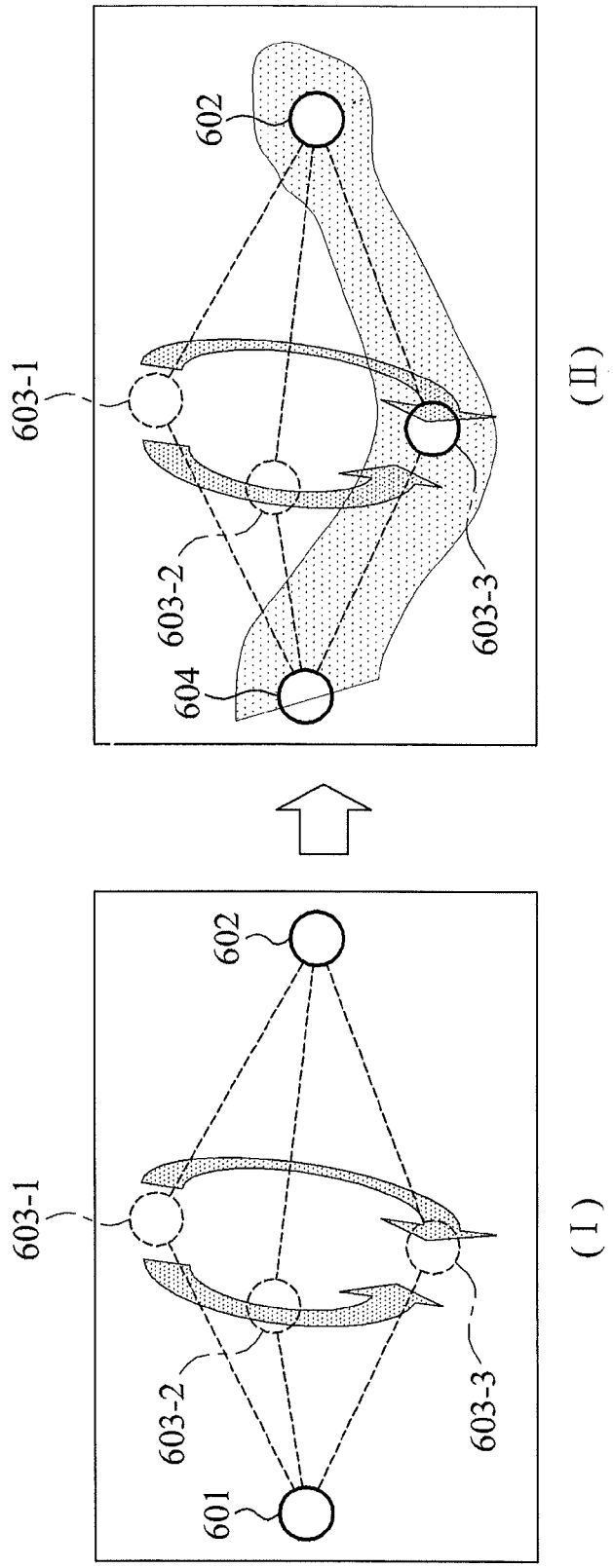
FIG. 6 illustrates a diagram of a process of generating a 3D skeleton model using image data based on motion data according to example embodiments.
Figure 7:
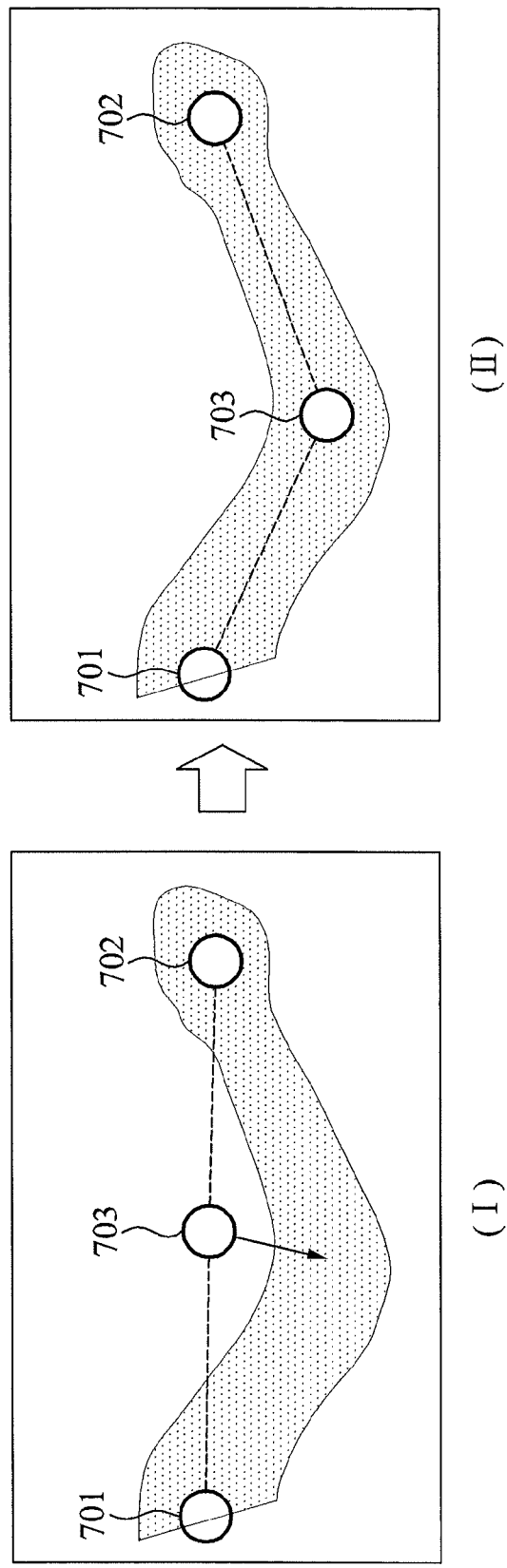
FIG. 7 illustrates a diagram of a process of generating a 3D skeleton model using motion data based on image data according example embodiments.
Figure 8:
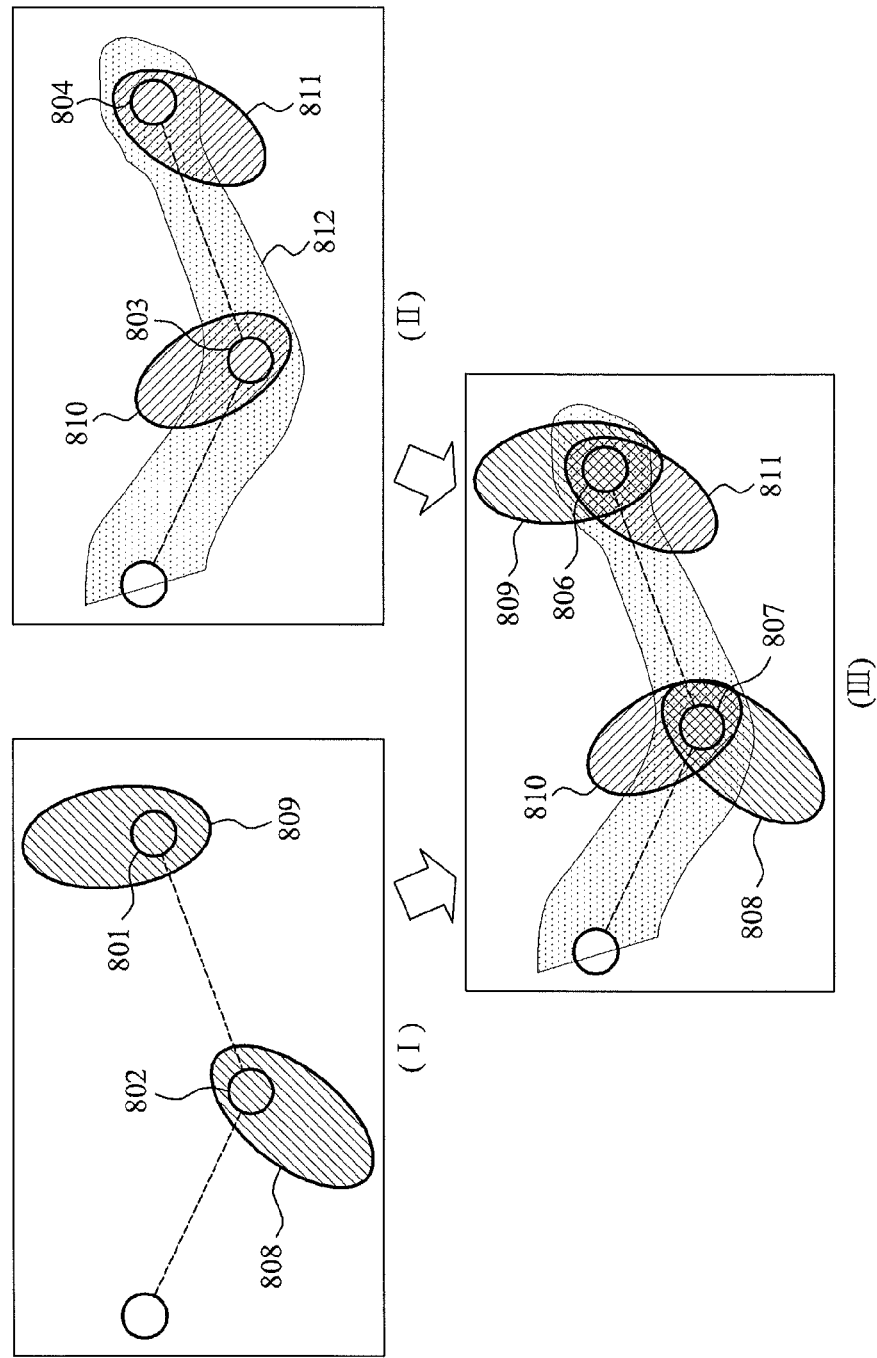
FIG. 8 illustrates a diagram of a process of refining the 3D skeleton model using the error ranges from the two generated 3D skeleton models according to example embodiments.

FIGS. 6 to 8 illustrate processes of generating a 3D skeleton model using the motion data and the image data.

FIG. 6 illustrates a diagram of a process of generating a 3D skeleton model using image data based on motion data according to example embodiments. Specifically, in FIG. 6, a process of referencing the image data when generating the 3D skeleton model with respect to the motion data is described in detail.

For example, the apparatus 100 (FIG. 1) may generate the 3D skeleton model of the entire body of the user from a position or orientation of a joint of the user while referencing a silhouette. In this instance, the apparatus 100 (FIG. 1) may calculate a solution of remaining joints from the position or orientation of the joint of the user included in the motion data using Inverse-Kinematics. In this instance, the apparatus 100 (FIG. 1) may select an optimal solution included in a range of the silhouette when the solution is plural.

Referring to operation (I) of FIG. 6, and FIG. 1, a joint 602 corresponding to a position of the motion sensor 108 is illustrated. Here, the motion data may include six axes information (position and orientation) or three axes (orientation or position), with respect to the joint 602. In this instance, when the apparatus 100 may set a specific position as a reference point 601 to apply Inverse-Kinematics, a plurality of solutions 603-1, 603-2, and 603-3 with respect to remaining joints may be created.

Referring to operation (II) of FIG. 6, and FIG. 1, the joint 602 corresponding to the position of the motion sensor 108 is illustrated. In this instance, the apparatus 100 may extract a reference point 604 using a silhouette extracted from image data. When Inverse-Kinematics is applied from a position or orientation of the joint 602 of the user with respect to the reference point 604, a plurality of solutions with respect to remaining joints may be created. For example, the apparatus 100 may calculate a position or orientation of a joint of the user corresponding to a solution 603-3 included in a range of the silhouette from among the plurality of solutions, including 603-1 and 603-2.

When a silhouette collected from a single image sensor is used, the apparatus 100 may calculate a two-dimensional (2D) distance between a position (position of the joint 602) of the motion sensor 108 and the solution 603-3. Also, when a silhouette collected from multiple image sensors is used, the apparatus 100 may calculate a 3D distance between a position (position of the joint 602) of the motion sensor 108 and the solution 603-3.

According to example embodiments, the apparatus 100 may generate a 3D skeleton model through a solution included in the range of the silhouette from among a plurality of solutions, thereby improving accuracy of the 3D skeleton model by means of an optimum solution having a minimum error.

FIG. 7 illustrates a diagram of a process of generating a 3D skeleton model using motion data based on image data according example embodiments. Specifically, in FIG. 7, a process of referencing image data when generating the 3D skeleton model with respect to the motion data will be described in detail.

For example, the apparatus 100 (FIG. 1) may generate the 3D skeleton model of the entire body of the user from a silhouette while referencing a position or orientation of a joint of the user. In this instance, the apparatus 100 (FIG. 1) may determine remaining joints included in the range of the silhouette using a reference point extracted from the silhouette and also using the position or orientation of the joint included in the motion data.

Referring to operation (I) of FIG. 7, and FIG. 1, the apparatus 100 may extract a reference point 701 from a silhouette extracted from image data. Also, the apparatus 100 may initialize the 3D skeleton model using the position and orientation of the joint 702 included in the motion data. Specifically, the reference point 701 and the joint 702 are connected with each other by the joint 703, whereby the 3D skeleton model is initialized.

Referring to operation (II) of FIG. 7, and FIG. 1, the apparatus 100 may set the reference point 701 and a position of the joint 702, and then generate a 3D skeleton model minimizing a matching error in a remaining joint 703. In the remaining joint 703 of operation (I) of FIG. 7, the matching error may be minimized in a position of the remaining joint 703 included in the range of the silhouette of operation (II) of FIG. 7.

According to example embodiments, the apparatus 100 may simplify, using the position or orientation of the joint 702 included in the motion data, a complex process of determining the remaining joint 703 from all positions and orientations capable of being generated in the reference point 701 and then determining the joint 702 from all positions and orientations capable of being generated again from the remaining joint 703, thereby improving a processing speed. Also, the apparatus 100 may prevent drifting of a joint by cross-using the image data and the motion data, thereby improving accuracy of the 3D skeleton model.

FIG. 8 illustrates a diagram of a process of generating a 3D skeleton model using an error range according to example embodiments.

For example, the apparatus 100 (FIG. 1) may generate a 3D skeleton model of an entire body of a user using an error range of each of the 3D skeleton model extracted from a position or orientation of a joint of the user and the 3D skeleton model extracted from a silhouette. In this instance, the apparatus 100 (FIG. 1) may combine the error range of each of the 3D skeleton models extracted from the silhouette and the position or orientation of the joint of the user, and select a position having a minimum error.

Referring to operation (I) of FIG. 8, an error range of each of the 3D skeleton models extracted from a position or orientation of a joint is illustrated. Referring to operation (II) of FIG. 8, an error range of each of 3D skeleton models extracted from a silhouette is illustrated. In this instance, the error range may denote a probability in which a joint of a user actually exists. For example, the error range may designate a distribution of a Gaussian function with respect to the probability in which the joint of the user is actually exhibited.

Referring to operation (I) of FIG. 8, in the 3D skeleton model extracted from the position or orientation of the joint included in the motion data, an error range 809 of a joint 801 and an error range 808 of a joint 802 are illustrated. In this instance, the error range 808 and the error range 809 may differ depending on a tracking quality of the motion sensor 108 (FIG. 1). As illustrated in operation (I) of FIG. 8, a position of the joint 801 may indicate that the probability in which the joint of the user is actually exhibited is relatively high, and a position of the joint 802 may indicate that the probability in which the joint of the user is actually exhibited is relatively high.

Referring to operation (II) of FIG. 8, in the 3D skeleton model generated using a silhouette 812 extracted from image data, an error range 810 of a joint 803 and an error range 811 of a joint 804 are illustrated. In this instance, the error range 810 and the error range 811 may include the error range of the joint and an error range of an estimate at the time of occlusion. The joint 803 and the joint 802 may exist in a similar position in the entire body of the user. Also, the joint 801 and the joint 804 may exist in a similar position in the entire body of the user.

Referring to operation (III) of FIG. 8, a result of combining the error range 810 and the error range 808 and a result of combining the error range 809 and the error range 811 are illustrated. When combining the error range 810 and the error range 808 as illustrated in operation (III) of FIG. 8, a joint 807 having a minimum error may be selected, and when combining the error range 809 and the error range 811, a joint 806 having a minimum error may be selected. Specifically, a joint of a final 3D skeleton model may be determined at a position of the joint 807 and the joint 806, having a high reliability.

According to example embodiments, by combining the error range of the 3D skeleton model generated from each of the image data and the motion data, information having the high reliability may be selected, thereby improving accuracy of the 3D skeleton model of the entire body of the user.

As illustrated in operation (VII) of FIG. 2, the 3D skeleton model of the entire body of the user as described in FIGS. 6 and 8 may be used for outputting the trajectory of the entire body of the user at every time instance.

Figure 9:
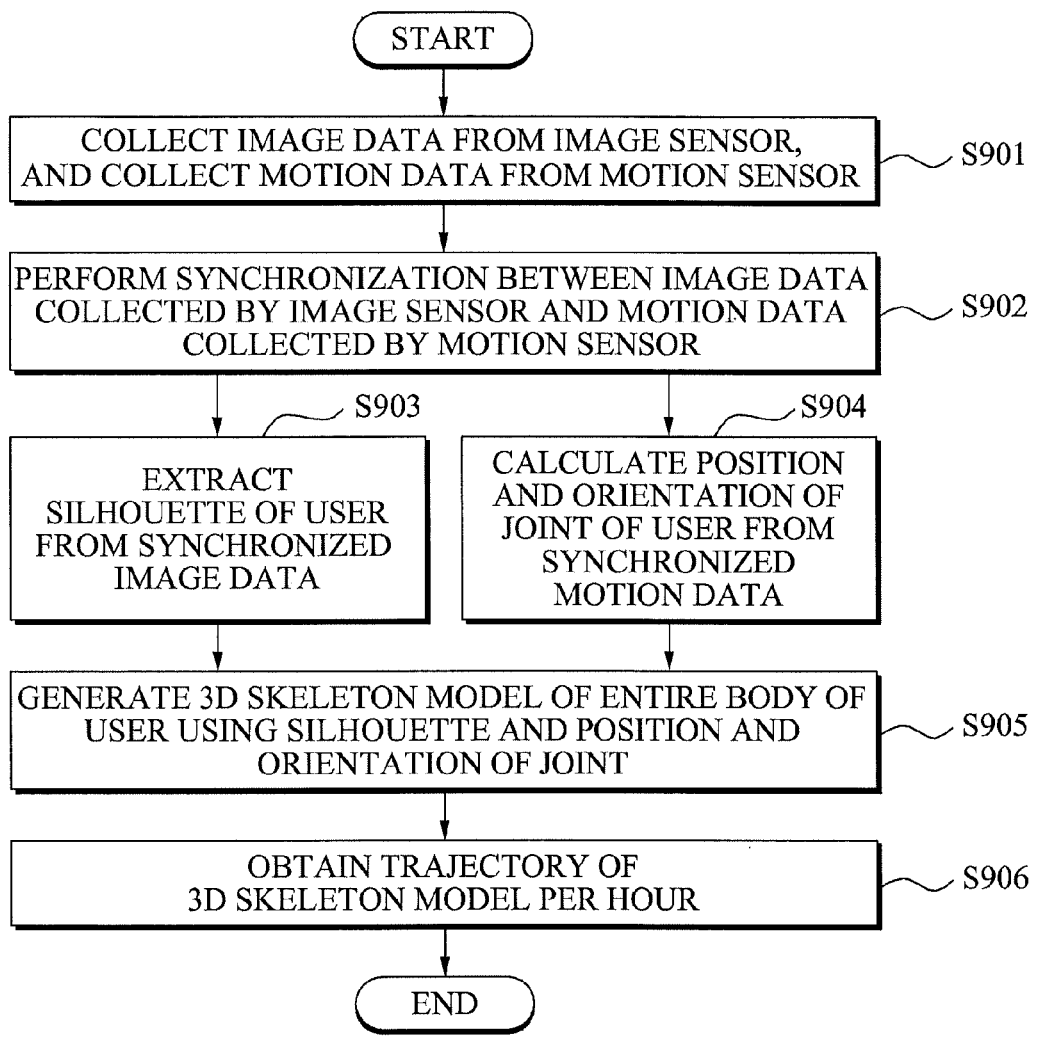
FIG. 9 illustrates a flowchart of an entire process of a method for generating a skeleton model according to example embodiments

FIG. 9 is a flowchart illustrating an entire process of a method for generating a skeleton model according to example embodiments.

Referring to FIGS. 1 and 9, in operation S901, an image sensor 107 may collect image data, and a motion sensor 108 may collect motion data. Then, the collected image data and motion data may be inputted in the apparatus 100.

In operation S902, the apparatus 100 may perform synchronization between the image data collected by the image sensor 107 and the motion data collected by the motion sensor 108. In this instance, the apparatus may synchronize position information (spatial synchronization) of data to cross-reference, in an identical position, the image data and the motion data each being collected in different positions. Also, the apparatus 100 may synchronize temporal information (temporal synchronization) of the image data and of the motion data to cross-reference, in an identical time, the image data and the motion data each being collected in different times.

For example, the apparatus 100 may synchronize the position information of data by converting a position of the motion sensor 108 in the image data and a position of the motion sensor 108 in the motion data based on a predetermined reference position. Also, the apparatus 100 may synchronize the temporal information of the motion data and of the image data using data interpolation.

In operation S903, the apparatus 100 may extract a silhouette of a user from the synchronized image data. A number of the extracted silhouettes may differ depending on a number of image data.

In operation S904, the apparatus 100 may calculate a position or orientation of a joint of a user from the synchronized motion data. In this instance, since the motion sensor 108 is attached on a part of joints of the entire body of the user, the position or orientation of the joint of the user may be calculated with respect to the part of the joints. Remaining joints may be calculated when generating the 3D skeleton model.

In operation S905, the apparatus 100 may generate the 3D skeleton model of the entire body of the user using the silhouette and also using the position or orientation of the joint.

According to example embodiments, the apparatus 100 may generate the 3D skeleton model of the entire body of the user from the position or orientation of the joint while referencing the silhouette. In this instance, the apparatus 100 may calculate a solution of remaining joints from the position or orientation of the joint of the user included in the motion data using Inverse-Kinematics. In this instance, the apparatus 100 may select an optimum solution included in a range of a silhouette when the solution is plural.

According to other example embodiments, the apparatus 100 may generate the 3D skeleton model of the entire body of the user from the silhouette while referencing the position or orientation of the joint. In this instance, the apparatus 100 may determine remaining joints included in the range of the silhouette using the position or orientation of the joint of the user included in the motion data and also using a reference point extracted from the silhouette.

According to other example embodiments, the apparatus 100 may generate the 3D skeleton model of the entire body of the user using an error range of each of the 3D skeleton models extracted from the silhouette and from the position or orientation of the joint of the user. In this instance, the apparatus 100 may combine the error range of each of the 3D skeleton models extracted from the silhouette and the position or orientation of the joint of the user, and select a position having a minimum error.

When the 3D skeleton model of the entire body of the user is generated in operations S901 to S905, the apparatus 100 may obtain a trajectory of the 3D skeleton model S906, at every time instance.

Descriptions referring to FIGS. 1 to 8 may be applicable for FIG. 9.

As described above, according to example embodiments, the 3D skeleton model of the entire body of the user may be generated using the motion data collected by the motion sensor and the image data collected by the image sensor, thereby improving accuracy of the 3D skeleton model.

According to example embodiments, the reference point may be provided in the image sensor, thereby minimizing a number of the motion sensors.

According to example embodiments, Inverse-Kinematics may be applied based on the position or orientation of the joint and the reference point of the silhouette to thereby obtain a plurality of solutions of the 3D skeleton model, and an optimum solution may be selected from among the plurality of solutions, thereby improving a processing speed and accuracy of generating the skeleton model.

According to example embodiments, the reference point of the silhouette and the position or orientation of the joint may be used, thereby generating an accurate 3D skeleton model.

According to example embodiments, the error range of each of the 3D skeleton models extracted from the silhouette and from the position or orientation of the joint of the user may be used, thereby generating the 3D skeleton model having a high reliability and high accuracy.

In addition to the above described embodiments, embodiments can also be implemented through computer readable code/instructions in/on a medium, e.g., a computer readable medium, to control at least one processing device to implement any above described embodiment. The medium can correspond to any medium/media permitting the storing and/or transmission of the computer readable code. Examples of code/instructions may include machine code, produced by a compiler, and files containing higher level code that may be executed by the computer using an interpreter.

The computer readable code can be recorded on a medium in a variety of ways, with examples of recording media including magnetic storage media (e.g., ROM, floppy disks, hard disks, etc.) and optical recording media (e.g., CD-ROMs, or DVDs). The computer readable code may also be transferred through transmission media as well as elements of the Internet, for example. Thus, the medium may be such a defined and measurable structure carrying or controlling a signal or information, such as a device carrying a bitstream, for example, according to one or more embodiments. The media may also be a distributed network, so that the computer readable code is stored/transferred and executed in a distributed fashion. Still further, as only an example, the processing device could include a processor or a computer processor, and processing elements may be distributed and/or included in a single device.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

What is claimed is:

1. An apparatus for generating a skeleton model, the apparatus comprising:
   a data synchronization unit to perform a synchronization upon image data for a user collected by an image sensor and motion data for the user collected by a motion sensor;
   a silhouette extraction unit to extract a silhouette of the user from the synchronized image data;
   a joint information calculation unit to calculate a position or orientation of a joint of the user from the synchronized motion data; and
   a skeleton model generation unit to generate a three-dimensional (3D) skeleton model of the user using the silhouette and the position or orientation of the joint of the user,
   wherein the skeleton model generation unit sets a reference point extracted from the silhouette and a position or orientation of the joint of the user included in the motion data, initializes positions or orientations of remaining joints of the user using the a position or orientation of the joint of the user included in the motion data, and determines positions or orientations of remaining joints of the user to be in a range of the silhouette.

2. The apparatus of claim 1, wherein the data synchronization unit further includes:
   a temporal synchronization unit to synchronize temporal information of the image data and of the motion data to cross-reference, at an identical time using data interpolation, the image data and the motion data each being collected in different times; and
   a spatial synchronization unit to synchronize position information of the image data and the motion data to cross-reference, in an identical position, the image data and the motion data each being collected in different positions.

3. The apparatus of claim 2, wherein
the spatial synchronization unit synchronizes the position information of the image data and the motion data by converting a position of the motion sensor in the image data and a position of the motion sensor in the motion data based on a predetermined reference position.

4. The apparatus of claim 1, wherein
the image sensor further includes a depth image sensor collecting depth image data with respect to the user or a color image sensor collecting color image data with respect to the user, and
the silhouette extraction unit extracts the silhouette of the user from the depth image data when the image sensor is the depth image sensor, and extracts the silhouette of the user from the color image data when the image sensor is the color image sensor.

5. The apparatus of claim 1, wherein the skeleton model generation unit generates the 3D skeleton model of the entire body of the user from the position or orientation of the joint of the user based on the silhouette.

6. The apparatus of claim 5, wherein the skeleton model generation unit calculates at least one solution of remaining joints of the user from the position or orientation of the joint of the user included in the motion data using Inverse-Kinematics, and selects an optimal solution included in a range of the silhouette when the at least one solution is plural.

7. The apparatus of claim 1, wherein the skeleton model generation unit generates the 3D skeleton model of the entire body of the user from the silhouette based on the position and orientation of the joint of the user.

8. An apparatus for generating a skeleton model, the apparatus comprising:
   a data synchronization unit to perform a synchronization respectively upon image data for a user collected by an image sensor and motion data for the user collected by a motion sensor;
   a silhouette extraction unit to extract a silhouette of the user from the synchronized image data;
   a joint information calculation unit to calculate a position or orientation of a joint of the user from the synchronized motion data; and
   a skeleton model generation unit to generate a three-dimensional (3D) skeleton model of the user using the silhouette and the position or orientation of the joint of the user,
   wherein the skeleton model generation unit generates the 3D skeleton model of the user using an error range of each of 3D skeleton models extracted from the silhouette and from the position or orientation of the joint of the user.

9. The apparatus of claim 8, wherein the skeleton model generation unit combines the error range of each of the 3D skeleton models extracted from the silhouette and the position or orientation of the joint of the user, and selects a position having a minimum error.

10. A method of generating a skeleton model, the method comprising:
    performing a synchronization upon image data for a user collected by an image sensor and motion data for the user collected by a motion sensor;
    extracting a silhouette of the user from the synchronized image data, the silhouette of the user being extracted from depth image data with respect to the user included in the synchronized image data;
    calculating a position or orientation of a joint of the user from the synchronized motion data; and
    generating a 3D skeleton model of the user using the silhouette and the position or orientation of the joint of the user,
    wherein the generating of the 3D skeleton model sets a reference point extracted from the silhouette and a position or orientation of the joint of the user included in the motion data, initializes positions or orientations of remaining joints of the user using the a position or orientation of the joint of the user included in the motion data, and determines positions or orientations of remaining joints of the user to be in a range of the silhouette.

11. The method of claim 10, wherein the performing further includes:
    synchronizing temporal information of the image data and of the motion data to cross-reference, at an identical time using data interpolation, the image data and the motion data each being collected from different times; and
    synchronizing position information of the image data and the motion data to cross-reference, in an identical position, the image data and the motion data each being collected in different positions.

12. The method of claim 11, wherein the synchronizing of the position information synchronizes the position information of the image data and the motion data by converting a position of the motion sensor in the image data and a position of the motion sensor in the motion data based on a predetermined reference position.

13. The method of claim 10, wherein the generating of the 3D skeleton model generates the 3D skeleton model of the entire body of the user from the position or orientation of the joint of the user based on the silhouette.

14. The method of claim 13, wherein the generating of the 3D skeleton model calculates a solution of remaining joints of the user from the position or orientation of the joint of the user included in the motion data using Inverse-Kinematics, and selects an optimal solution included in a range of the silhouette when the solution is plural.

15. The method of claim 10, wherein the generating of the 3D skeleton model generates the 3D skeleton model of the entire body of the user from the silhouette based on the position or orientation of the joint of the user.

16. At least one non-transitory storage medium comprising computer readable instructions causing at least one processing device to implement the method of claim 10.

17. A method of generating a skeleton model, the method comprising:
  performing a synchronization upon image data for a user collected by an image sensor and motion data for the user collected by a motion sensor;
  extracting a silhouette of the user from the synchronized image data;
  calculating a position or orientation of a joint of the user from the synchronized motion data; and
  generating a 3D skeleton model of the user using the silhouette and the position or orientation of the joint of the user,
  wherein the generating of the 3D skeleton model generates the 3D skeleton model of the user using an error range of each of 3D skeleton models extracted from the silhouette and from the position or orientation of the joint of the user.

18. The method of claim 17, wherein the generating of the 3D skeleton model combines the error range of each of the 3D skeleton models extracted from the silhouette and the position or orientation of the joint of the user, and selects a position having a minimum error.

* * * * *

UNITED STATES PATENT AND TRADEMARK OFFICE
CERTIFICATE OF CORRECTION

PATENT NO. : 8,766,977 B2
APPLICATION NO. : 12/539170
DATED : July 1, 2014
INVENTOR(S) : Chang Yeong Kim et al.

It is certified that error appears in the above-identified patent and that said Letters Patent is hereby corrected as shown below:

In the Claims

Column 11, Line 20, In Claim 1, Delete "using the a" and insert -- using the --, therefor.

Column 12, Line 2, In Claim 8, Before "upon" delete "respectively".

Column 12, Line 42, In Claim 10, Delete "using the a" and insert -- using the --, therefor.

Signed and Sealed this
Eleventh Day of November, 2014

Michelle K. Lee
*Deputy Director of the United States Patent and Trademark Office*